United States Patent [19]
Lee

[11] Patent Number: 6,031,952
[45] Date of Patent: Feb. 29, 2000

[54] BROADBAND COUPLER

[75] Inventor: Ho-Shang Lee, El Sobrante, Calif.

[73] Assignee: Dicon Fiberoptics, Inc., Berkeley, Calif.

[21] Appl. No.: 09/191,137

[22] Filed: Nov. 13, 1998

[51] Int. Cl.[7] .............................. G02B 6/26; H04J 14/02
[52] U.S. Cl. .............................. 385/47; 385/24; 385/31; 385/32; 385/36; 385/39; 385/42; 359/127; 359/129
[58] Field of Search .................................. 385/24, 31, 32, 385/33, 34, 36, 39, 42, 44, 45, 47; 359/127, 129

[56] References Cited

U.S. PATENT DOCUMENTS

| | | | |
|---|---|---|---|
| 4,213,677 | 7/1980 | Sugimoto et al. | 385/34 X |
| 4,486,071 | 12/1984 | Levinson | 385/34 X |
| 4,550,975 | 11/1985 | Levinson et al. | 385/34 X |
| 4,600,267 | 7/1986 | Yamasaki et al. | 385/36 X |
| 4,714,313 | 12/1987 | Kapany et al. | 385/36 X |
| 4,997,248 | 3/1991 | Stowe | 385/43 X |
| 5,082,343 | 1/1992 | Coult et al. | 385/34 |
| 5,119,453 | 6/1992 | Gonthier et al. | 385/43 |
| 5,245,680 | 9/1993 | Sauter | 385/24 |
| 5,652,814 | 7/1997 | Pan et al. | 385/24 |
| 5,682,452 | 10/1997 | Takahashi | 385/85 |
| 5,796,889 | 8/1998 | Xu et al. | 385/24 |
| 5,889,904 | 3/1999 | Pan et al. | 385/24 |

*Primary Examiner*—Brian Healy
*Attorney, Agent, or Firm*—Majestic, Parsons, Siebert & Hsue P.C.

[57] ABSTRACT

An input light beam is deflected by a totally reflective surface of a corner prism towards another surface of the prism which is coated by a partially reflective coating. A predetermined percentage of the input power is reflected by this coating and the remainder transmitted therethrough. The reflected optical power is collected by an output fiber and the transmitted power is directed towards another coating which either totally or partially reflects such power to another output fiber to accomplish optical coupling.

16 Claims, 2 Drawing Sheets

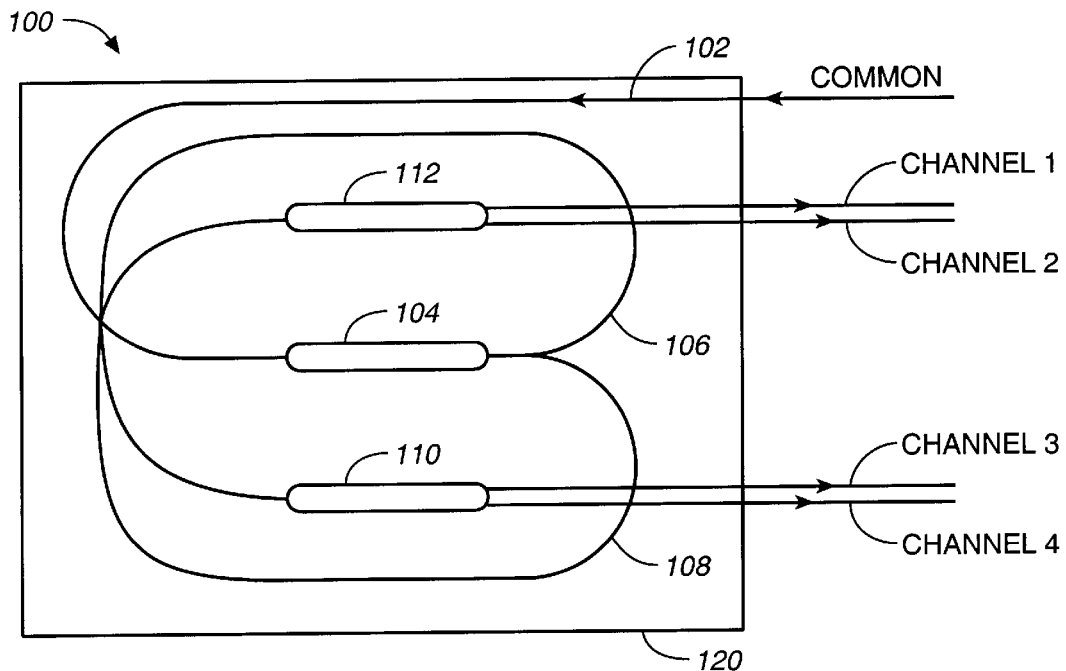
FIG._1
(PRIOR ART)
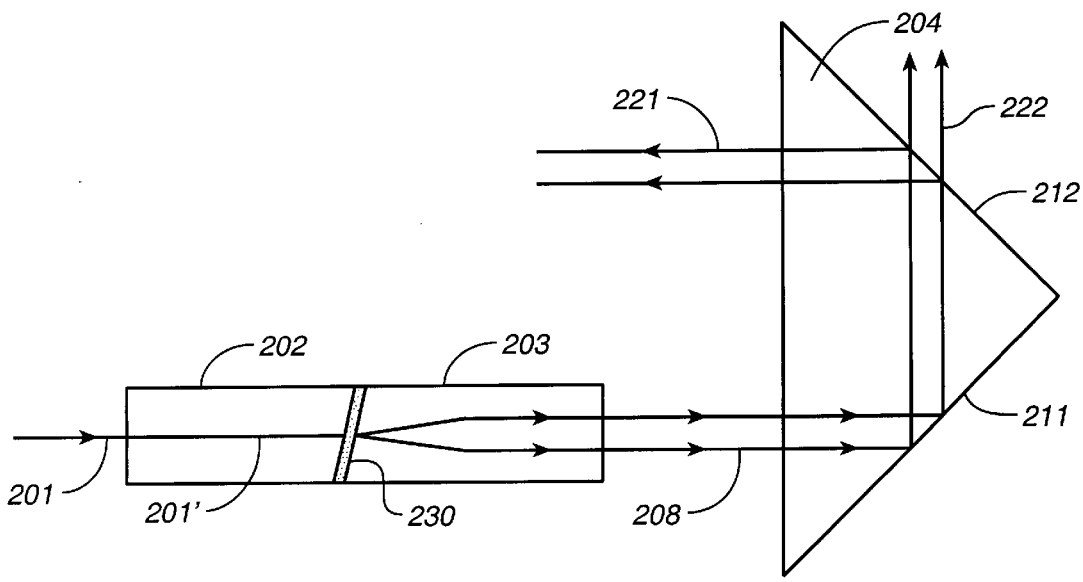
FIG._2

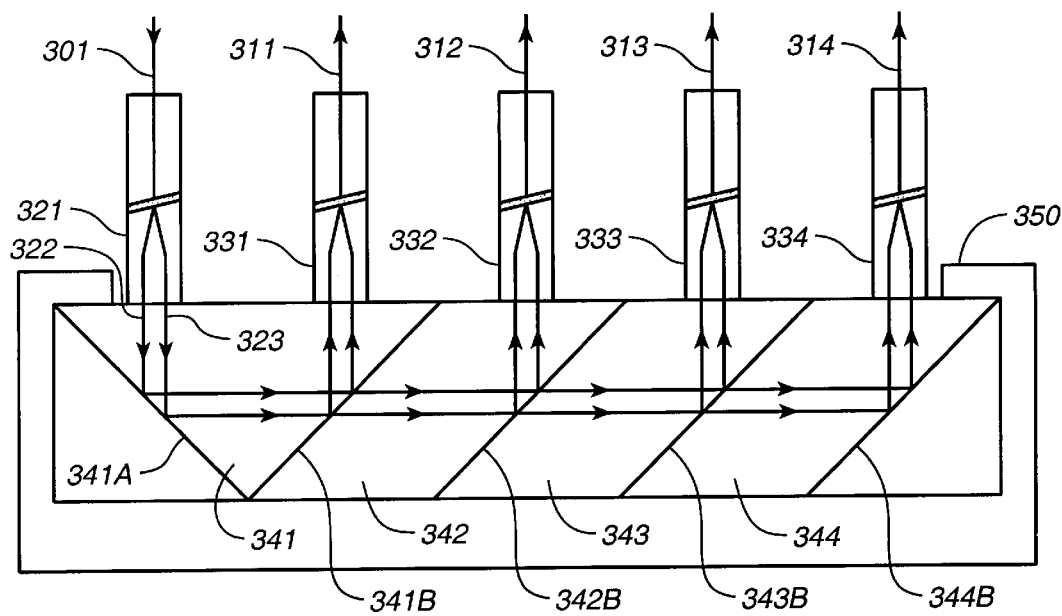
FIG._3A
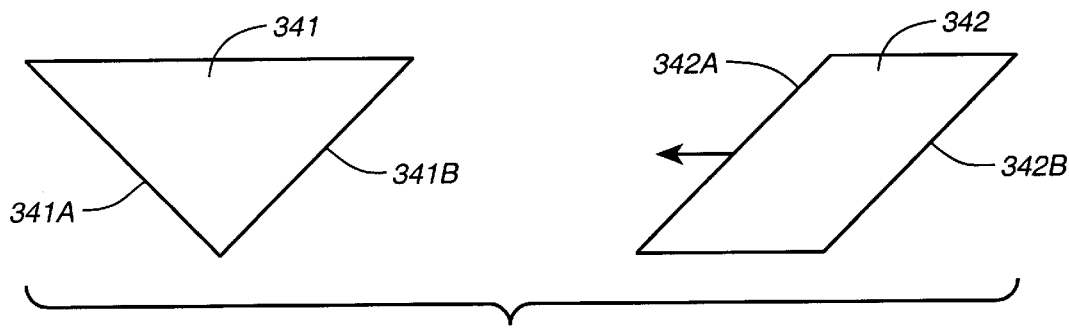
FIG._3B
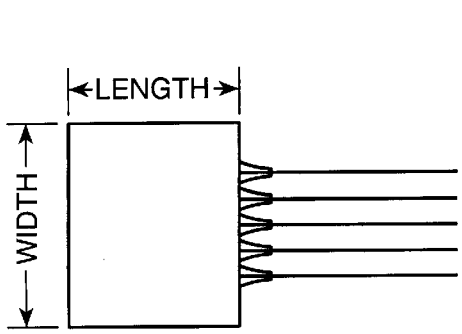
FIG._4A
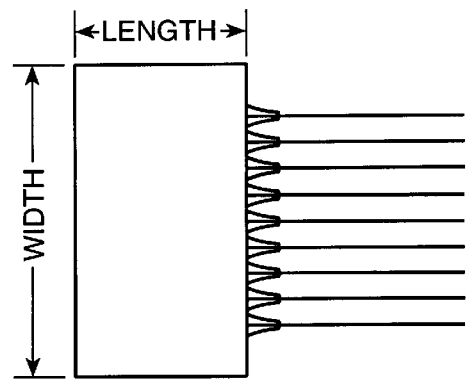
FIG._4B

BROADBAND COUPLER

BACKGROUND OF THE INVENTION

This invention relates in general to a broadband coupler and in particular, to a broadband coupler employing two or more layers of material where each layer reflects and passes predetermined percentages of power where the percentages are substantially independent of wavelength of the radiation.

Fused Biconical Taper (FBT) technology is widely used to produce a fiber optic coupler. A Technical Note on FBT couplers entitled "Specifying Fiber Optic Couplers" published by Gould Inc., Glen Burine, Md., introduces the FBT technology and its advantage and challenge. FBT technology is an easy and cheap method for making fiber optic couplers. However, the FBT coupler is wavelength dependent. Furthermore, cascading multiple 1×2 couplers is required to make a uniform multi-port splitter resulting in large packaging size and extra labor cost.

A 1×4 coupler in the product catalog entitled "Single-Mode Fiber Optic Components" of Selco Products Co., Buena Park, Calif., is shown in FIG. 1, where the coupler is composed of three 1×2 couplers connected by fibers. To reduce excessive fiber bending, the length and width of the housing need to be of the order of three inches. At such size, the coupler occupies too much valuable space for many applications.

In modern wavelength division multiplexing (WDM) communication, it is often desirable and sometimes required to use wavelength insensitive components for the broad bandwidth operation of the WDM system. The FTB described above is not practical for such applications.

It is therefore desirable to provide an improved wavelength independent multiport coupler for modern WDM communication and other applications.

SUMMARY OF THE INVENTION

Electromagnetic radiation is received and passed to a first layer of material that reflects and passes predetermined percentages of power of the electromagnetic radiation received. The predetermined percentages are substantially independent of wavelength of the radiation. Electromagnetic radiation passed by the first layer may be passed to one or more additional layers of material, where each of the one or more additional layers reflects and/or passes predetermined percentages of power of the received electromagnetic radiation that has passed the first layer. The predetermined percentages reflected and/or passed by the additional layers are substantially independent of wavelength of the radiation. The radiation that is reflected or passed by the layers are then transmitted to corresponding output ports.

Thus, in the broadband coupler of this invention, an input port receives electromagnetic radiation. The coupler has two or more layers of material, each layer reflecting and/or passing predetermined percentages of power of the electromagnetic radiation received at the input port. The predetermined percentages are substantially independent of wavelength of the radiation. Three or more output ports transmit radiation reflected or transmitted by the layers.

BRIEF DESCRIPTION OF THE DRAWINGS

FIG. 1 is a schematic view of a conventional 1×4 coupler comprising three 1×2 couplers to illustrate a conventional FBT coupler.

FIG. 2 is a schematic view of a prism with reflective coating and a collimator to illustrate the invention.

FIG. 3A is a schematic view of a 1×4 coupler to illustrate the preferred embodiment of the invention.

FIG. 3B is a schematic view of the corner prism and a rhombus prism in the coupler of FIG. 3A to illustrate the coupler.

FIGS. 4A and 4B are schematic views of a 1×4 and 1×8 coupler respectively to illustrate the invention.

DETAILED DESCRIPTION OF THE PREFERRED EMBODIMENT

FIG. 1 is a schematic view of a conventional 1×4 coupler 100 employing three 1×2 couplers 102 connected together by optical fibers. Thus, the incoming beam is applied along fiber 102 which supplies the incoming beam to a 1×2 coupler 104 connected to two fibers 106 and 108. The input beam is split by coupler 104 into two beams along the two fibers 106, 108. The beam along fiber 106 is applied to another 1×2 coupler 110 which splits the beam into two along channels 3 and 4 respectively. The other beam along fiber 108 is supplied to a 1×2 coupler 112 which splits the beam into two beams along channels 1 and 2.

To avoid excessive optical losses, the optical fibers 102, 106, 108 should not be bent excessively. Therefore, fibers 102, 106, 108 should be of adequate length to avoid such excessive bending. As a result, the housing 120 for housing the three couplers 104, 110, 112 and the optical fibers 102, 106, 108 need to be of the order of three inches in length and width. This is undesirable, since many applications for couplers require more compact and less space consuming designs.

This invention is based on the recognition that by employing coatings or layers of material that transmit and reflect predetermined percentages of an incoming beam, a much more compact 1×n coupler may be constructed, where n is a positive integer, such as 2, 4, 8, 16 etc. When a coating or layer is such that the percentages of power transmitted there through and reflected by it are independent of wavelength, a coupler employing such layer or layers would also operate to transmit and reflect predetermined percentages of incoming power over a broad spectrum of wavelengths, so that such coupler is wavelength independent. This is illustrated in reference to FIG. 2.

FIG. 2 shows a collimated beam deflected by a corner prism. The optical power carried by the fiber 201 is incident on the gradient index ( GRIN) lens 203 and is well collimated as it exits the lens. The collimated beam is indicated as 208. A ferrule 202 is used to encapsulate the fiber end 201' of the fiber 201. The ferrule is either attached to the GRIN lens 203 by adhesive bond 230 or fixed relative to GRIN lens 203 with a small air gap by a supportive member such as a tubing (not shown). Both surfaces 211 and 212 of the corner prism 204 are coated with generally different reflective coatings. Multi-layer thin film coating is preferred because its reflectivity is substantially wavelength insensitive over the full operating wavelength for WDM system, e.g. wavelength spectrum from 1530 to 1590 nm. The coating on 211 ideally has 100% reflectivity, and that on 212 is partially reflective and partially transmissive, with predetermined percentages of optical power that is reflected and transmitted. The collimated beam 208 is deflected about 90 degrees on the surface 211 and then strikes on the surface 212. Partial power is transmitted as indicated along path 222 and the remaining power is deflected about 90 degrees by reflection as indicated by output path 221. Output ports (not shown) can be used to transmit beams 221, 222 to outside devices as desired. Coatings or layers having such properties may be formed on surfaces 211, 212 in a way known to those skilled in the art.

FIG. 3A illustrates a 1×4 coupler. FIG. 3B is a schematic diagram illustrating the corner prism and rhombus prism in the preferred embodiment of FIG. 3A. In FIG. 3B, the corner prism 341 and rhombus prism 342 are shown with more separation that is actually the case in FIG. 3A so as to illustrate more clearly the beams of radiation that are transmitted and reflected.

In reference to FIGS. 3A and 3B, incoming power carried inside the common fiber 301 is collimated into collimated beam by collimator 321. The collimator 321 can be either bonded to corner prism 341 by an adhesive layer 322 or fixed against the corner prism 341 with an air gap in between by a supportive piece joining prisms to the collimator (not shown). A highly reflective coating, ideally 100% reflection, is applied to the surface 341A of the corner prism 341. The other surface 341B of the corner prism 341 has thereon a partially reflective coating, such as 25% reflection. Collimated beam 323 is deflected about 90 degrees on the surface 341A and then hits the surface 341B. As shown in FIG. 3A, a portion of optical power, saying 25%, is reflected by the coating at surface 341B and the remaining power, such as 75%, is transmitted through the coating and surface 341B, assuming that there is little absorption by the reflective coating as well as by the corner prisim. The 25% reflected power is then focused to an output fiber 311 through the collimator 331.

FIG. 3B indicates how the rhombus prism 342 is assembled with the corner prism 341. Rhombus prism 342 is either physically attached to the corner prism 341 by an adhesive layer or fixed against the corner prism 341 with a small gap in between by a supportive piece joining 341 to 342 (not shown). If air gap is kept, an anti-reflection coating is applied to the surface 342A of the rhombus prism 342 to reduce the optical loss and unwanted reflection. It is clear that instead of applying on the surface 341B the reflective coating for splitting the optical beam, the coating can be applied instead on the surface 342A The transmitted beam through the coating on interface 341B is further partially reflected by the partially reflective coating on the surface 342B. The reflectivity of this reflective coating on the surface 342B is determined by the desired power sharing (distribution) to the fiber 312 and other additional fibers, if any, such as fibers 313, 314 in FIG. 3A. If the optical power in the fiber 312 is designed to be close to that in fiber 311, the reflectivity at the interface 342B is about 33%.

Partial reflection and partial transmission of the power transmitted by the coating and surface 342B also occur at the coating at interface 343B. The fiber 313 is used to receive the reflected power from the reflective coating at the interface 343B. This coating is designed to have 50% reflectivity if power directed to the fiber 313 is to be close to those in fiber 311 and 313. At the coating on end surface 344B of the last rhombus prism 344, a reflective coating with reflectivity close to 100% is preferred. The last fiber 314 in the row picks up from all residual power from the incoming fiber 301. Obviously the coatings or layers at the interfaces 341B–343B may have reflectivities different from those mentioned above to achieve any percentage of desired power sharing between the four output fibers or ports 211–314; such and other variations are within the scope of the invention. In a similar manner, a 1×n coupler, n being any integer greater than 2, may be constructed by using more or fewer rhombus prisms and output fibers.

The prism assembly consisting of prisms 341–344 is mounted to a mechanical bracket 350. It should be noted that in the present invention indicated in FIG. 3A, all fibers are arranged in the same side of the prism set. It makes the packaging compact and is easy for installation. It will be understood, however, that this is not required and that the fibers may be arranged on different sides of the prism set.

In the present invention an 1×4 coupler can be packed in a housing of not more than about 25 mm in length and width as shown in FIG. 4A, and not more than about 10 mm thick in dimensions. A housing of not more than about 40 mm in width and 25 mm in length and about 10 mm thick in dimensions as shown in FIG. 4B is sufficient to pack an 1×8 coupler, which is much smaller than any existing 1×8 FBT coupler.

While the invention has been described above by reference to various embodiments, it will be understood that changes and modifications may be made without departing from the scope of the invention, which is to be defined only by the appended claims and their equivalents.

What is claimed is:

1. A broadband coupler comprising:
   an input port receiving electromagnetic radiation;
   two or more layers of material, each layer reflecting and/or passing predetermined percentages of power of the electromagnetic radiation received at the input port, said predetermined percentages being substantially independent of wavelength of the radiation; and
   three or more output ports transmitting radiation reflected or transmitted by the layers.

2. The coupler of claim 1, wherein at least one of the layers passes a fraction of the electromagnetic radiation received from the input port to another one of the layers, said another one of the layers reflecting such fraction or a portion thereof to one of the output ports.

3. The coupler of claim 1, each of two or more output ports transmitting radiation reflected by a corresponding one of the layers.

4. The coupler of claim 1, further comprising a prism element with a first and a second surface at an angle to each other, wherein the second surface is attached to or adjacent to one of the layers.

5. The coupler of claim 4, wherein the input port is located so that said electromagnetic radiation from the input port is substantially totally reflected by the first surface towards the second surface and the layer that reflects and passes said electromagnetic radiation substantially totally reflected by the first surface.

6. The coupler of claim 1, further comprising one or more elements, each of said one or more elements attached or adjacent to a corresponding one of the layers.

7. The coupler of claim 6, wherein each of the one or more output ports transmits electromagnetic radiation that has been passed by one or more of the elements.

8. The coupler of claim 6, wherein at least one of said elements includes a rhombus prism.

9. The coupler of claim 8, further comprising a prism element with a first and a second surface at an angle to each other, wherein the second surface is attached or adjacent to the layer and the layer is attached or adjacent to said rhombus prism.

10. The coupler of claim 4, wherein said angle is substantially 90 degrees.

11. The coupler of claim 1, wherein the input port includes a collimator collimating the electromagnetic radiation received.

12. The coupler of claim 1, wherein each of the three or more output port includes a collimator collimating the electromagnetic radiation transmitted from the coupler.

13. The coupler of claim 1, further comprising a housing containing said layer, said input and output ports being supported by the housing.

14. The coupler of claim 13, said coupler including four output ports, said housing having dimensions not more than about 25 by 25 mm in length and width and not more than about 10 mm in thickness.

15. The coupler of claim 13, said coupler including eight output ports, said housing having dimensions not more than about 25 by 40 mm in width and length and not more than about 10 mm in thickness.

16. A method for broadband coupling, comprising:

receiving electromagnetic radiation;

passing the received electromagnetic radiation to a first layer of material that reflects and passes predetermined percentages of power of the electromagnetic radiation received, said predetermined percentages being substantially independent of wavelength of the radiation;

passing the electromagnetic radiation passed by the first layer to one or more additional layers of material, wherein each of the one or more additional layers reflects and/or passes predetermined percentages of power of the received electromagnetic radiation that has passed the first layer, said predetermined percentages being substantially independent of wavelength of the radiation; and transmitting radiation reflected or passed by the layers to corresponding output ports.

\* \* \* \* \*